United States Patent [19]

Angel et al.

[11] Patent Number: 4,606,960
[45] Date of Patent: Aug. 19, 1986

[54] PROCESS FOR MAKING HONEYCOMB SANDWICH PANELS

[75] Inventors: James R. P. Angel; Peter A. A. Wangsness, both of Tucson, Ariz.

[73] Assignee: Research Corp., N.Y.

[21] Appl. No.: 706,080

[22] Filed: Feb. 27, 1985

[51] Int. Cl.$^4$ .......................................... C03B 23/207
[52] U.S. Cl. ........................................ 428/116; 65/36; 65/42; 65/44; 264/242; 264/248; 264/259; 428/118
[58] Field of Search ............... 264/242, 248, 259; 65/38, 39, 42, 44, 36; 428/116, 118

[56] References Cited

U.S. PATENT DOCUMENTS

| | | | |
|---|---|---|---|
| 2,988,959 | 6/1961 | Pelkey et al. | 428/116 |
| 3,133,133 | 5/1964 | Fairbanks | 65/36 UX |
| 3,137,602 | 6/1964 | Lincoln | 65/36 X |
| 3,283,655 | 11/1966 | Rau | 65/36 X |
| 3,325,266 | 6/1967 | Stong | 65/36 X |
| 3,535,098 | 10/1970 | Babcock | 65/36 X |
| 3,728,186 | 4/1973 | Mohn | 65/42 X |
| 4,447,130 | 5/1984 | Christiansen et al. | 428/116 X |

Primary Examiner—Arthur Kellogg
Attorney, Agent, or Firm—Scully, Scott, Murphy & Presser

[57] ABSTRACT

A process for making a honeycomb sandwich panel in a single furnace cycle which is particularly applicable to making a glass honeycomb sandwich panel as might be utilized in the construction of a glass mirror substrate. In one embodiment, lengths of glass tubing are sandwiched between glass faceplates. On heating to softening temperature, the faceplates are compressed between rigid plates until they are sealed against the open tube ends. Then the sealed tubes are inflated, or the external gas pressure decreased, so the tubes expand and seal also against each other. At the same time the softened faceplates are pressed against and conform to the shape of the rigid restraining plates. One way to achieve inflation of the tubes is with a gas manifold communicating through a hole in the back faceplate and into each tube. A pressure differential is maintained while the glass is cooled until it becomes rigid.

23 Claims, 8 Drawing Figures

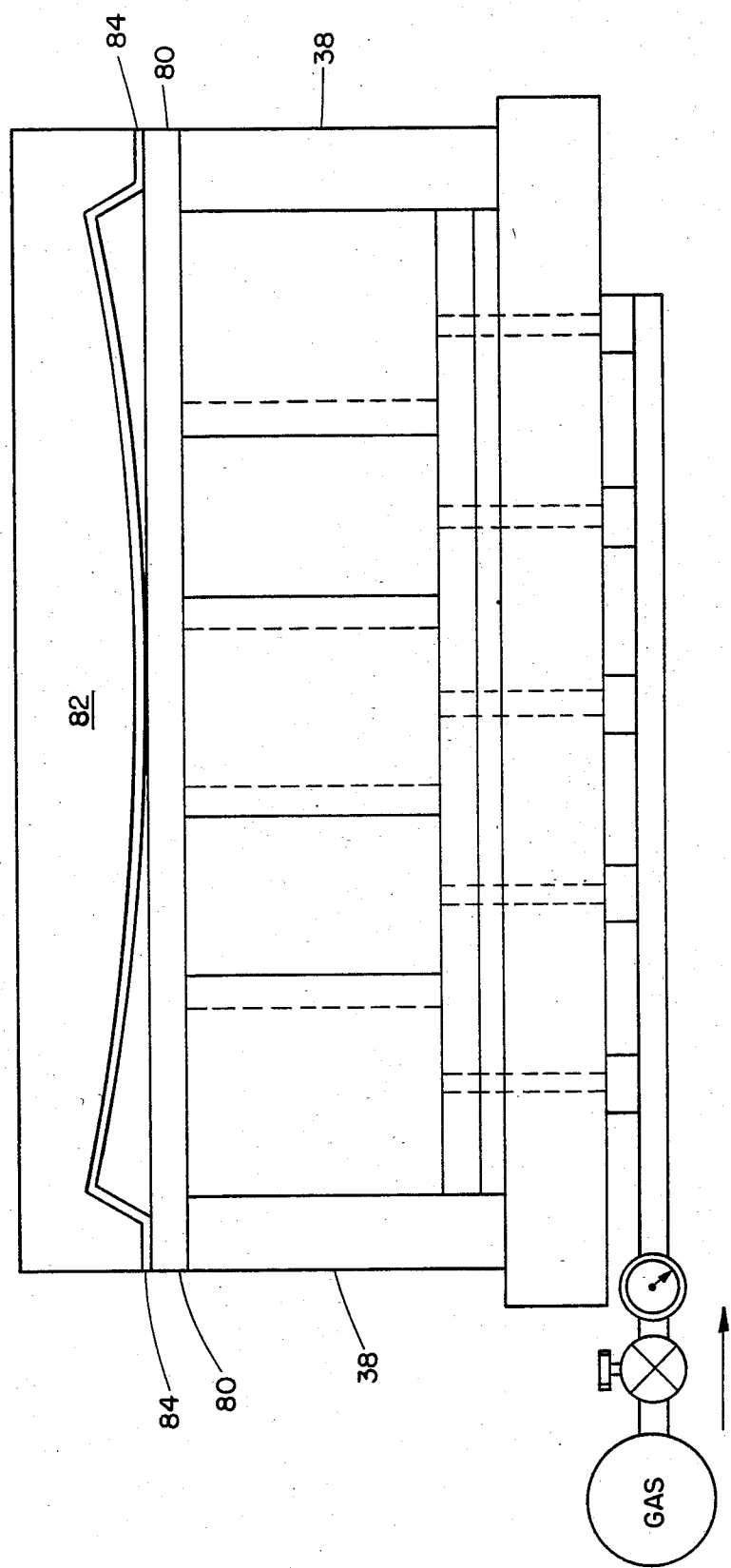

PROCESS FOR MAKING HONEYCOMB SANDWICH PANELS

BACKGROUND OF THE INVENTION

1. Field of the Invention

The present invention relates generally to a process for making honeycomb sandwich panels, and more particularly pertains to an improved process which is particularly applicable to glass and forms a resultant glass honeycomb sandwich panel in a single furnace cycle.

2. Discussion of Prior Art

Honeycomb sandwich panels are a common structural form, combining high rigidity, low weight and low thermal inertia, and are a preferred structure for glass mirror substrates. Their property of low thermal inertia, and the resulting absence of convective distortion, has recently been recognized as a fundamental advantage for large ground-based optical systems. There is also a practical advantage of low thermal inertia in that high quality optics of inexpensive glasses with non-zero expansion coefficients can be readily figured, without long delays involved in allowing the mirror to achieve a state of thermal equilibrium during testing thereof. Applications such as mirror substrates take advantage of the good stability, homogeneity and low thermal expansion that can be achieved in glass.

Presently available processes for the manufacture of glass honeycomb sandwich structures are rather elaborate. Typically the honeycomb interior is prepared separately by cutting, fitting and fusing on a piece by piece basis. In greater detail, glass mirrors with a monolithic honeycomb structure have been formed in the prior art from a very low expansion titanium silicate glass by welding "L" shaped pieces to make a square cell structure. This technique of making the honeycomb is laborious, frequently taking months of effort to complete, and is not suitable for most glasses because of the impracticality of welding together glass pieces with appreciable thermal expansion coefficients. After assembly, the fragile open honeycomb must be precisely machined to fit the faceplates, and is then fused or frit bonded between the face places. High material and manufacturing costs prohibit the use of such glass honeycomb sandwich structures in all but the most expensive optical systems, such as in large diffraction limited satellite cameras.

Mirror substrates with a monolithic internal honeycomb structure have also been cast in the prior art as a single piece in a complex mold, but these structures tend to be somewhat heavy.

Lighter weight fusion bonded mirror substrates have also been constructed in the prior art, but have an internal structure of plates, tubes, or slotted struts that are bonded only to the faceplates and not to each other. This type of construction, utilized for example in the mirrors of The Multiple Mirror Telescope, does not realize the full stiffness given by a monolithic honeycomb core.

A further prior art process, perhaps the most pertinent to the present invention, is described by Angel (Proc. SPIE, 383, 52, 1983) in which a hexagonal glass honeycomb is formed from individual round glass tubes in the following manner. The tubes are first hexagonal close packed, and are then filled with free-flowing sand. Upon softening of the glass by heating, the sand acts to press the tubes outwardly against each other, causing them to fuse together into a monolithic hexagonal honeycomb. Large sheets of very regular honeycomb have been constructed in one step in this manner, but the process is slow because of the thermal inertia of the sand, and also requires subsequent machining and fusing of the faceplates to the honeycomb structure. This prior art process differs from the present invention in several significant aspects, namely, in this prior art process only a subassembly (i.e. the interior glass honeycomb structure) is formed in a single furnace cycle, and moreover, the subassembly glass honeycomb structure produced thereby must be machined prior to the application thereto of glass faceplates in a separate fusing or frit bonding operation.

SUMMARY OF THE INVENTION

Accordingly, it is a primary object of the present invention to provide a process for making honeycomb sandwich panels in a single furnace cycle.

A further object of the subject invention is the provision of a process as described which is particularly applicable to making a glass honeycomb sandwich panel.

In accordance with the teachings herein, the present invention provides a method of producing a substantially monolithic honeycomb sandwich panel structure, in which a plurality of tubes are positioned adjacent to each to form a honeycomb array of tubes wherein the tubes are in direct contact or close proximity with adjacent tubes. First and second end plates are then positioned adjacent to the first and second opposite ends of the tubes. The tubes and end plates are then heated to an elevated temperature at which the materials in the tubes and plates soften to form bonds therebetween, thereby sealing each tube. Finally, while the tubing are in a heated, softened and sealed condition, a gas pressure differential is established between the inside and outside of the tubes to exert an outward gas pressure on each softened tube, thereby pressing each softened tube against adjacent softened tubes to form bonds therebetween along the areas of pressed contact, in addition to the bonds formed between each softened tube and the first and second end plates, thereby forming the substantially monolithic honeycomb sandwich panel structure.

In one preferred embodiment of the subject invention a plurality of gas ports are provided in one end plate, with a gas port communicating with the interior of each tube to apply a pressure differential thereacross as a positive gas pressure applied to the interior of each tube, preferably with an inert gas. However, an alternative embodiment is also described wherein a vacuum is applied exterior to the sealed tubes.

In one preferred embodiment of the present invention a plurality of cylindrically shaped tubes, are pressed into a substantially hexagonal monolithic honeycomb structure. When initially round tubes are hexagonally close packed, then they subsequently become essentially hexagonal over most of their boundary, with possibly only a small unbonded region at the common intersections. While a hexagonal honeycomb is formed conveniently from circular tubing, it may be advantageous, for other geometries in particular, to use non-circular cross section tubes as a starting point. For example, square cell honeycomb could start with near square tubing with rounded corners and slightly convex sides to the squares to ensure that the fusion bond starts out from the center of each face. Similarly, triangular cross section honeycomb would start with somewhat rounded triangular tubing. Similarly, different honeycomb geometries can be produced by changing the tube placement. For example, circular cylindrical tubes on a square grid after inflation give a square cell honeycomb.

Moreover, in preferred embodiments of the subject invention, restraining members are positioned along outside edges of the honeycomb sandwich panel structure to restrain the outer edges thereof and to provide a means of controlling the final thickness of the honeycomb sandwich panel, when in a heated and softened condition, and to provide a means of controlling the final thickness of the honeycomb sandwich panel.

Moreover pursuant to the teachings of the present invention, a monolithic honeycomb structure with a curved end plate surface can also be formed starting with a monolithic honeycomb sandwich structure already formed with first and second substantially flat end plates, by placing one flat end plate of the monolithic honeycomb sandwich structure against a curved mold, and then heating the structure to allow the material to soften and conform against the curved mold. In an alternative embodiment, one or both of the first and second end plates can be initially curved, and the end faces of the tubes are angled, as by cutting, to conform to the curved end plate(s) prior to being positioned to form the monolithic honeycomb structure.

In one preferred embodiment of the subject invention, the process of the present invention can be described in further detail as follows: first a flat base plate is constructed with a manifold that can supply gas to each cell of the honeycomb; a flat sheet of glass drilled with holes is then placed on the plate, with a gasket in between to provide a pressure seal. Glass tubes, cut with square ends and all of the same length, are then set in position, closely packed so a hole in the back sheet leads into each tube. A second flat sheet of glass is then placed on top, and a rigid top plate above it. The sides of the panel are bounded to restrain the outer shape thereof during the pressurization step. The assembly is then heated until the tube ends fuse to the face sheets, as seen by a slight settling of the top plate. At this point the manifold is pressurized until the honeycomb is formed and the upper glass face is pressed flat against the top plate. The completed structure is then annealed and cooled to room temperature.

The method of the present invention is suitable for any material type that is stable against the temperature cycle for the process. Fused silica, titanium silicate glass, 96% silica, borosilicate, aluminonsilicate and other higher expansion glasses are all good candidates. Glass ceramics which rely on controlled devitrification to achieve low expansion coefficients are also possible materials, but may present additional difficulties. The restraining plates and side walls may be made from such materials as metals, ceramics, graphite or other suitable materials and coated with a releasing agent to prevent sticking, (e.g. ceramic fiber paper, talc, etc . . . ). Although the procedures of the present invention were developed specifically with glass fabrication in mind, the process could be used with other materials having similar properties including, but not limited to given plastics, composites and metals.

The advantages of the present invention over the prior art are its relative speed and simplicity, and the method allows very lightweight construction because the softened glass during bonding is stabilized by pressure against sagging under gravity.

BRIEF DESCRIPTION OF THE DRAWINGS

The foregoing objects and advantages of the present invention for a process for making honeycomb sandwich panels may be more readily understood by one skilled in the art with reference being had to the following detailed description of several preferred embodiments thereof, taken in conjunction with the accompanying drawings wherein like elements are designed by identical reference numerals throughout the several views, and in which:

FIG. 8 illustrates another alternative embodiment whereby the tubes and plates begin as uniform length and flatness, and the pressurizing process both fuses and deforms tubes to a honeycomb structure, while also pushing the upper plate against a convex master to create a concave surface.

DETAILED DESCRIPTION OF THE DRAWINGS

Figure 1:
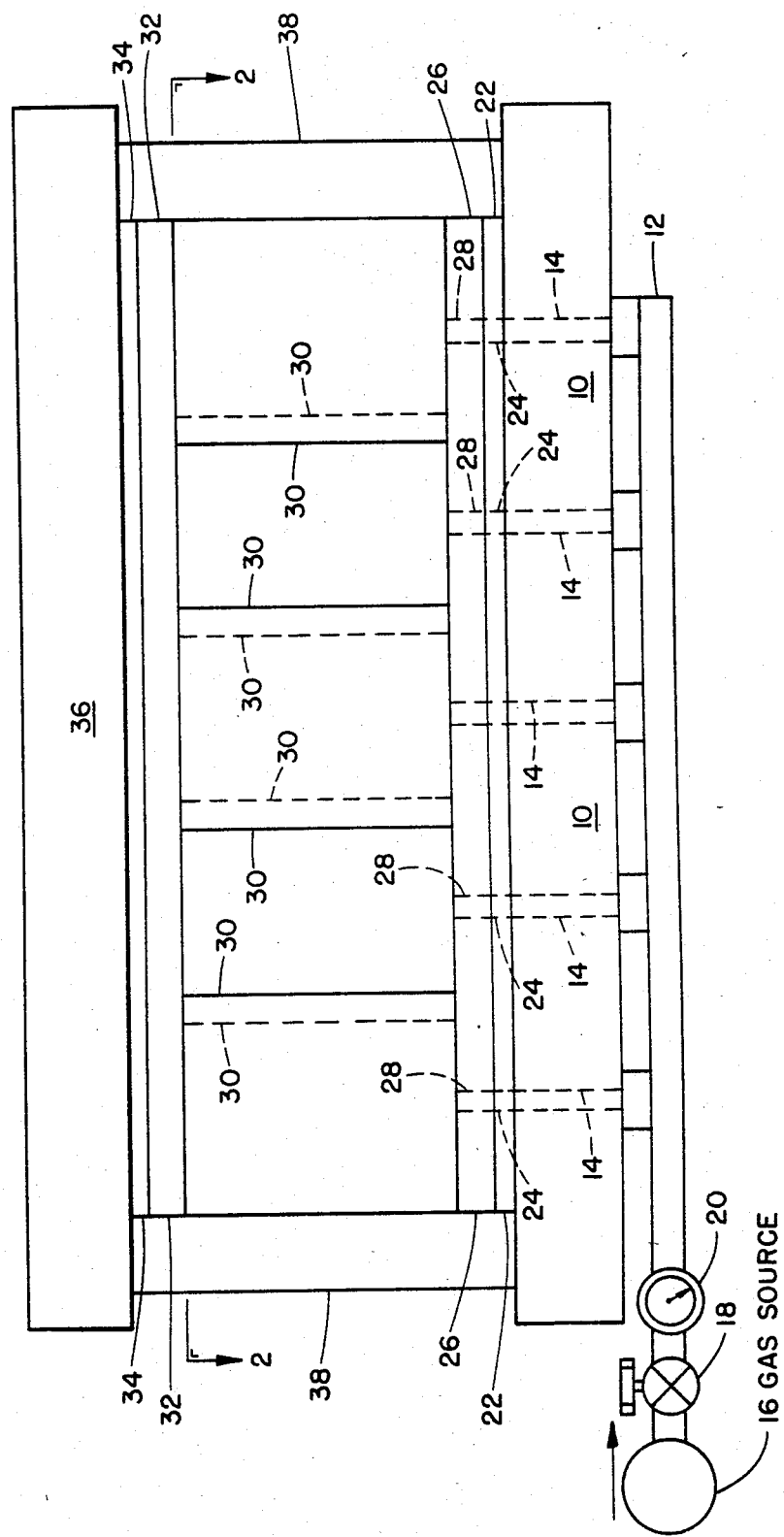
FIG. 1 is an elevational view of an exemplary embodiment of a monolithic honeycomb sandwich panel structure being constructed pursuant to the teachings of the present invention.

Referring to the drawings in detail, FIG. 1 illustrates an elevational view of an exemplary embodiment of a monolithic honeycomb sandwich panel structure being constructed pursuant to the teachings of the present invention. In this arrangement a rigid flat base plate 10 is initially constructed with a manifold 12 and a plurality of gas ports 14, one for each tube in the honeycomb structure to be formed. A gas source 16 can supply gas through a pressure regulating valve 18, monitored by a pressure gauge 20, to manifold 12 and through gas ports 14 to the interior of each tube in the honeycomb structure. A gasket 22 can be of any suitable material that provides a non-wetting surface to prevent the glass from sticking while also providing a pressure seal if necessary. The gasket 22 has a plurality of gas ports 24 therethrough aligned with the gas ports 14, and is placed on plate 10, to prevent bonding or sticking of the honeycomb structure to the base plate 10.

The gas source 16 can be any suitable gas such as air, or an inert gas such as Argon, which would reduce surface fogging caused by a slight oxidation on the tubes and end plates.

Figure 2:
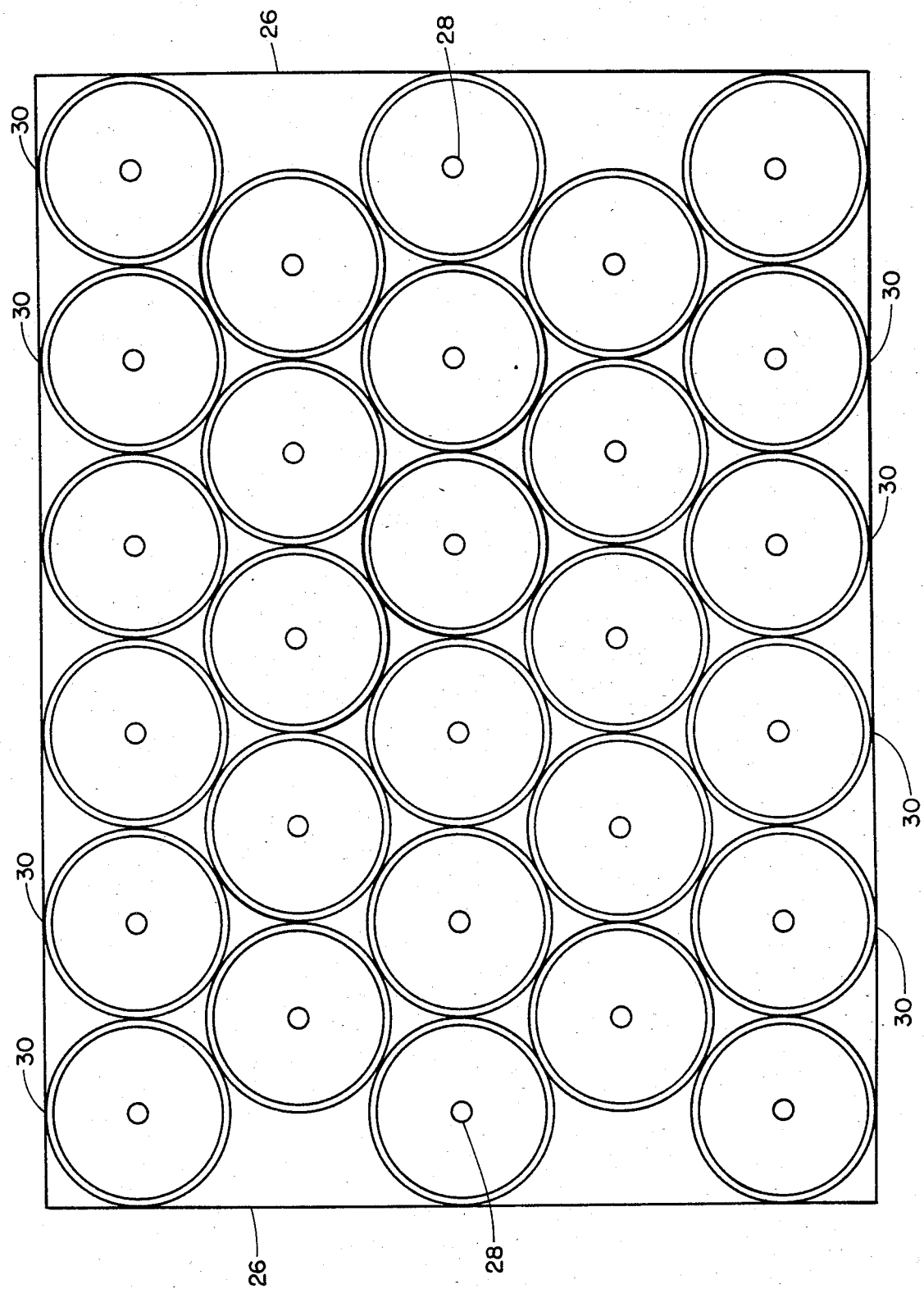
FIG. 2 illustrates a plan view of only the glass tubes and end plate, taken along the direction of line 2—2 in FIG. 1.

A flat sheet of glass 26, having a plurality of gas ports 28 therethrough aligned with the gas ports 14 and 24, is then placed on the gasket 22. Glass tubes 30, cut with square ends and all of the same length, are then set in hexagonal closed packed positions, as shown in FIG. 2 in positions in which a gas port leads into the interior of each tube. A second flat sheet of glass 32 is then placed on top, and a rigid top plate 36 above it, again with a gasket 34 therebetween to prevent the glass from sticking. The sides of the panel are bounded by sheets 38 to restrain the outer shapes of the sides during the fusion step.

Figure 3:
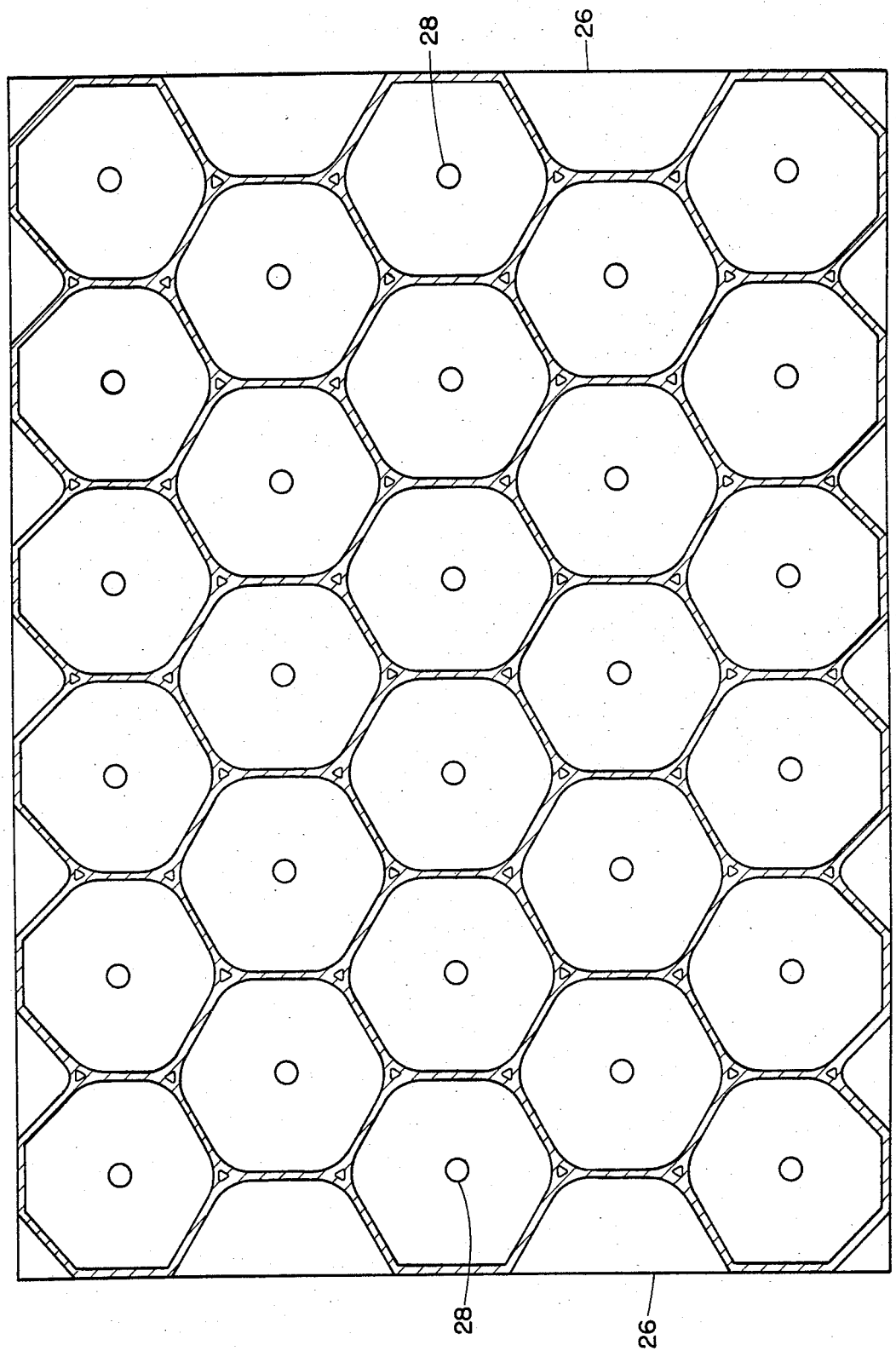
FIG. 3 is a sectional view, taken along sectional line 3—3 of FIG. 4, illustrating a substantially hexagonal monolithic honeycomb structure formed by the apparatus of FIGS. 1 and 2 when utilized pursuant to the teachings of the present invention.
Figure 4:
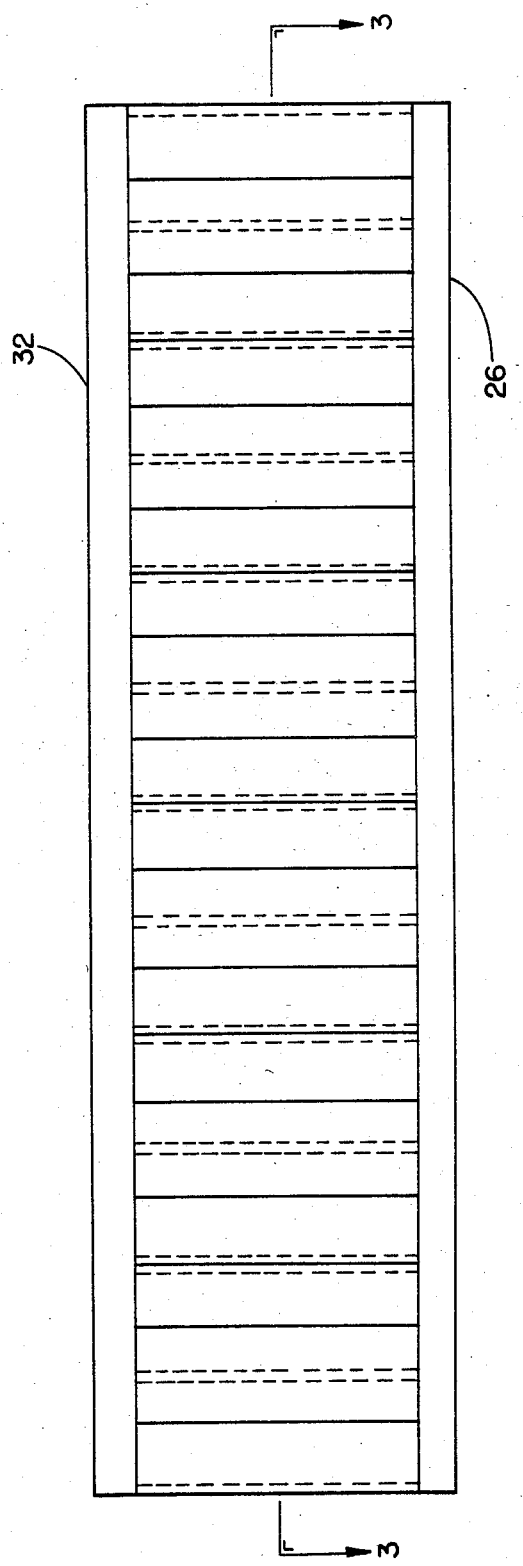
FIG. 4 is an elevational view of the hexagonal monolithic honeycomb structure of FIG. 3.

The assembly is then heated until the tube ends fuse to the face sheets, as seen by a slight settling of the top plate 36, the weight of which facilitates the sealing of the tubes to the plate surfaces. At this point, the manifold 12 is pressurized until the honeycomb is formed and the upper glass face 32 is pressed flat against the top plate 36. The completed structure, as illustrated in FIGS. 3 and 4, is then annealed and cooled to room temperature.

A variety of different honeycomb geometries can be formed by this method, depending on the initial shape and placement of the tubes. If round tubes are used, then hexagonal or square honeycomb can be readily fused, depending on whether the tubes are hexagonally close packed as shown in FIG. 2 or square packed. When initially round tubes are hexagonally close packed, then they subsequently become essentially hexagonal over most of their boundary, with possibly only a small unbonded region at the common intersections. While a hexagonal honeycomb is formed conveniently from circular tubing, it may be advantageous, for other geometries in particular, to use non-circular cross section tubes as a starting point. For examples, square cell honeycomb could start with near square tubing with rounded corners and slightly convex sides to the squares to ensure that the fusion bond starts out from the center of each face. Similarly, triangular cross section honeycomb would start with somewhat rounded triangular tubing.

Figure 5:
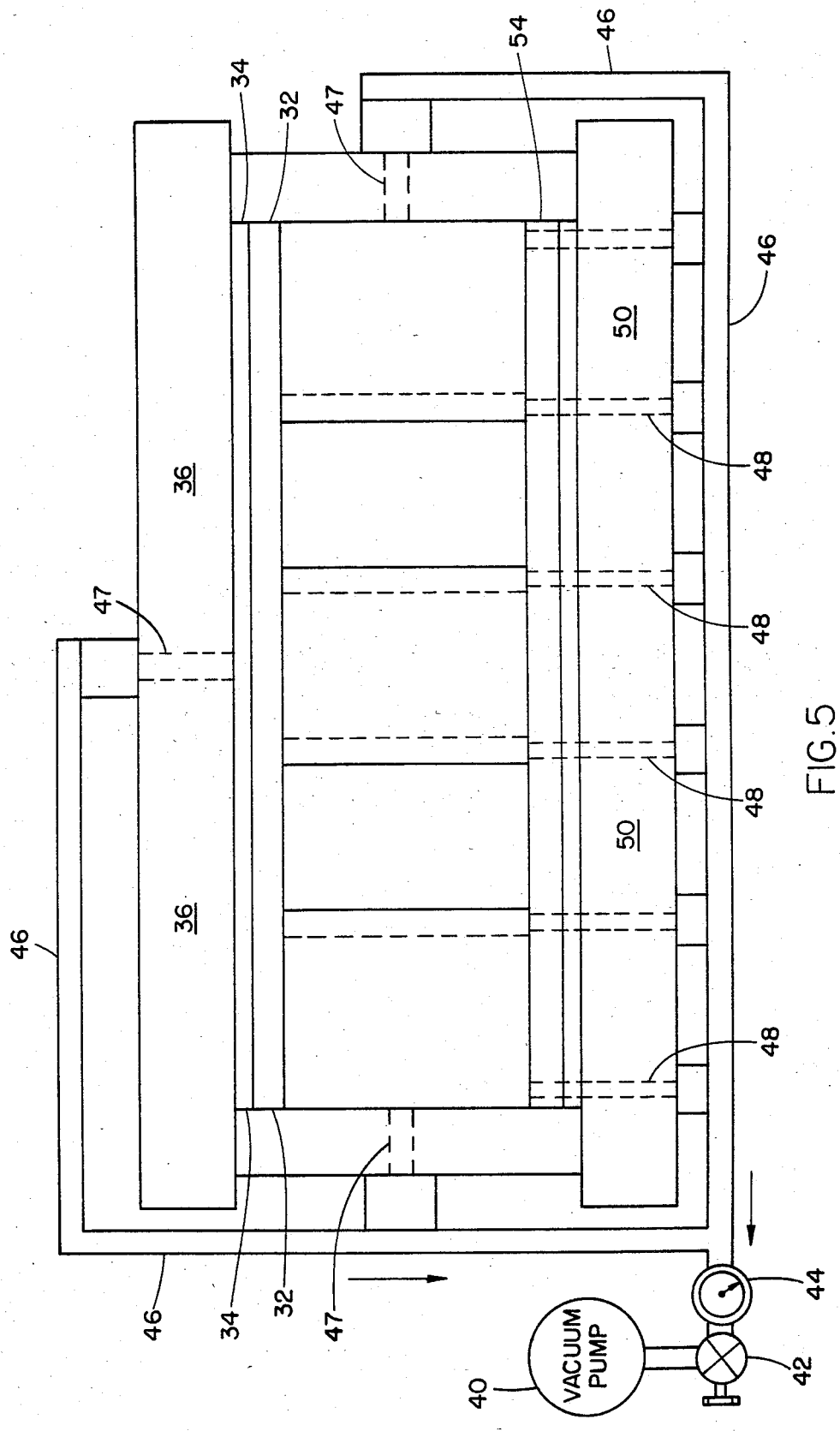
FIG. 5 illustrates a modified embodiment of apparatus suitable for practicing the process of the present invention, similar to the apparatus of FIG. 1 but wherein a vacuum source applies a pressure differential during the process, either to the entire mold cavity or to the entire furnace interior.

FIG. 5 illustrates an alternative embodiment, somewhat similar to the arrangement of FIG. 1 but wherein a vacuum is applied to the spaces in the honeycomb structure between the tubes and end plates. In this arrangement a vacuum pump 40 supplies a vacuum through a pressure regulating valve 42, monitored by a vacuum gauge 44, to a manifold 46, through aligned vacuum ports 48 in the bottom plate 50, gasket 52, and bottom glass plate 54 to the spaces in the honeycomb structure between the tubes and end plates. The manifold 46 also supplies vacuum to additional vacuum ports 47 located at spaced positions around the honeycomb structure.

In alternative embodiments, the vacuum might be supplied either to the entire mold cavity (excluding tube interiors) or to the entire furnace interior (excluding tube interiors). In this embodiment, vacuum ports are required only to evaluate the honeycomb structure exterior to the tube volumes, and no elaborate manifold is necessary.

The construction method with the arrangement of FIG. 5 is similar to that of FIG. 1, but the vacuum pump 40 supplies the pressure differential across each of the glass tubes. In an alternative embodiment, the techniques of FIGS. 1 and 5 might be combined to simultaneously supply a positive gas pressure to the interior of each tube and a vacuum to the spaces between the tubes and end plates.

The method of construction of the present invention has been developed and tested with the tubes 30 and end plates 26 and 32 being constructed of glass such as fused silica, titanium silicate glass, 96% silica, borosilicate, aluminonsilicate, and other higher expansion glasses. However, other suitable materials should also have applicability herein such as glass ceramics which rely on controlled devitrification to achieve a low thermal expansion coefficient, certain types of plastics, composites and metals.

Figure 6:
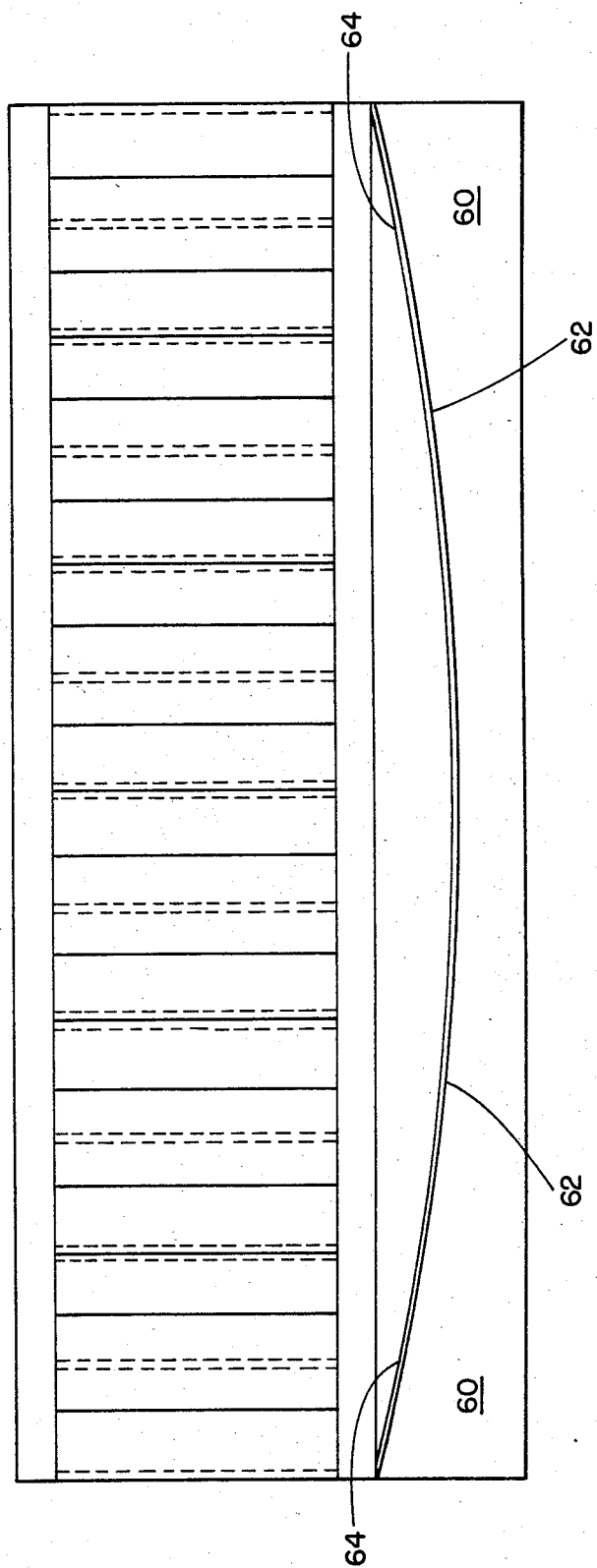
FIG. 6 illustrates an elevational view of a further embodiment wherein the hexagonal monolithic honeycomb structure of FIG. 4 formed starting with first and second substantially flat end plates, is subsequently changed to a structure having a curved end plate surface by placing one flat end plate of the monolithic honeycomb sandwich structure against a curved mold, and then heating the structure to allow the material to soften and conform against the curved mold (slumping)

FIG. 6 illustrates a further modification pursuant to the teachings of the present invention wherein a monolithic honeycomb structure with a curved end plate surface can also be formed starting with a monolithic honeycomb sandwich structure already formed with first and second substantially flat end plates, as illustrated in FIGS. 3 and 4, by placing one flat end plate 32 of the monolithic honeycomb sandwich structure against a curved mold 60, having a desired curved upper surface 62, and lined with gasket material 64. The structure is then reheated to allow the material to soften and conform against the curved surface 62 of the mold.

Figure 7:
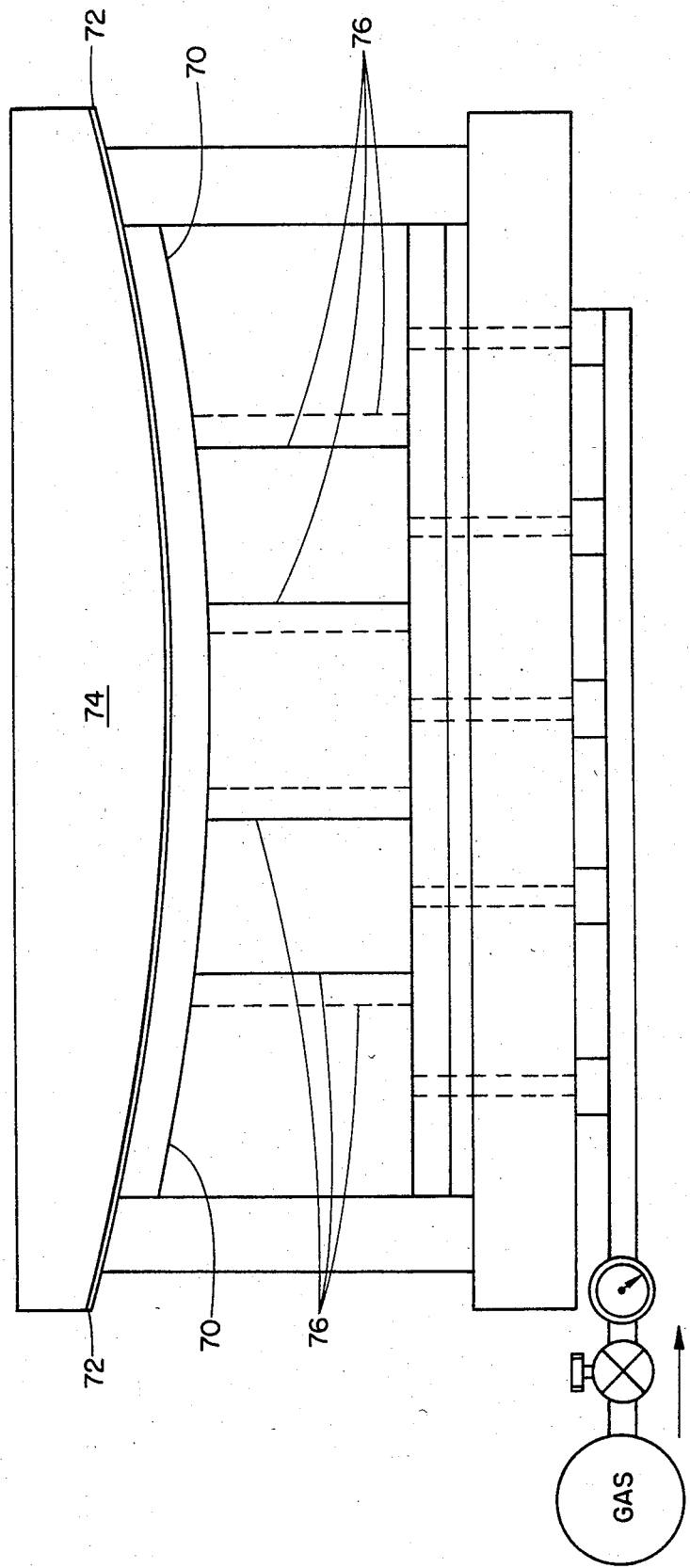
FIG. 7 illustrates an alternative embodiment for forming a monolithic honeycomb sandwich structure with a curved end surface wherein one of the end plates is initially curved, and the end faces of the tubes are angled, as by cutting, to conform to the curved end plate prior to being positioned to form the monolithic honeycomb structure.

FIG. 7 illustrates a further alternative embodiment wherein a top plate 70 is initially curved and placed adjacent to a curved ceramic gasket 72, placed adjacent to a curved top support plate 74. In this embodiment the top end faces of the closely packed tubes are first angled, as by angled cutting thereof, to conform to the curved end plate 70 prior to being positioned in the closely packed array. The structure at the bottom of the tubes is then similar to the structure at the bottom of the tubes in FIG. 1, and the process of the present invention then proceeds in a manner as has been previously described with respect to FIG. 1. In an alternative embodiment, both the top and bottom end plates could be initially curved, and both the top and bottom ends of the tubes would be angled as appropriate to fit the contours of the top and bottom end plates.

FIG. 8 illustrates another alternative embodiment wherein the tubes and plates begin as uniform length and flatness, and the pressurizing process both fuses and deforms the tubes to a honeycomb structure while also pushing an upper plate 80 against a convex master 82 (with a gasket 84 therebetween) to create a concave upper surface.

While several embodiments and variations of the present invention for a process for making honeycomb sandwich panels are described in detail herein, it should be apparent that the disclosure and teachings of the present invention will suggest many alternative designs to those skilled in the art.

What is claimed is:

1. A method of producing a substantially monolithic honeycomb sandwich panel structure, comprising the steps of:
   a. positioning a plurality of tubes adjacent to each other in positions to form a honeycomb array of tubes wherein the tubes are in direct contact or close proximity to adjacent tubes;

b. positioning first and second end plates adjacent first and second opposite ends of the tubes;

c. heating the tubes and end plates to an elevated temperature at which the materials in the tubes and end plates soften to form bonds therebetween, to seal each tube; and d. subjecting each tube, while in a heated, softened and sealed condition, to a gas pressure differential thereacross to exert an outward gas pressure on each softened tube, to press each softened tube against adjacent softened tubes to form bonds betweens adjacent softened tubes along the areas of pressed contact in addition to the bonds formed between each softened tube and the first and second end plates, to form the substantially monolithic honeycomb sandwich panel structure.

2. A method of producing a substantially monolithic honeycomb sandwich panel structure as claimed in claim 1, wherein said tubes and end plates are selected from vitreous materials comprising fused silica, titanium silicate glass, 96% silica, borosilicate, aluminosilicate glass, glass ceramics, ceramics and plastics.

3. A method of producing a substantially monolithic honeycomb sandwich panel structure as claimed in claim 1, wherein said tubes and end plates are formed of glass.

4. A method of producing a substantially monolithic honeycomb sandwich panel structure as claimed in claim 1, said at least one end plate having a plurality of gas ports therein, with at least one gas port communicating with the interior of each tube to apply a pressure differential thereacross.

5. A method of producing a substantially monolithic honeycomb sandwich panel structure as claimed in claim 4, wherein said step of subjecting each tube to a pressure differential thereacross includes the step of applying a positive gas pressure to the interior of each tube.

6. A method of producing a substantially monolithic honeycomb sandwich panel structure as claimed in claim 5, wherein said step of applying a positive gas pressure includes the step of supplying an inert gas under a positive pressure to the interior of each glass tube.

7. A method of producing a substantially monolithic honeycomb sandwich panel structure as claimed in claim 1, wherein said step of subjecting each tube to a pressure differential thereacross includes the step of applying a vacuum applying a vacuum external to the sealed tubes.

8. A method of producing a substantially monolithic honeycomb sandwich panel structure as claimed in claim 1, wherein said step of positioning a plurality of tubes includes positioning a plurality of cylindrically shaped tubes, each having an initial, substantially circular shape outer tube surface, and wherein the softened tubes are pressed into a substantially hexagonal monolithic honeycomb structure.

9. A method of producing a substantially monolithic honeycomb sandwich panel structure as claimed in claim 1, further including the step of positioning at least one restraining member along an outside edge of the honeycomb sandwich panel structure to restrain the outer edge thereof and to restrain the collapse of the honeycomb to a predetermined total thickness when in a heated and softened condition.

10. A method of producing a substantially monolithic honeycomb sandwich panel structure as claimed in claim 9, including the step of positioning at least one restraining member around the entire outer edge of the honeycomb sandwich structure to restrain it therein and to restrain the collapse of the honeycomb to a predetermined total thickness when in a heated and softened condition.

11. A method of producing a substantially monolithic honeycomb sandwich panel structure as claimed in claim 1, wherein said first and second end plates are substantially flat plates, and further including the step of placing the formed substantially monolithic honeycomb sandwich structure with one end plate thereof against a curved mold, and heating the structure to allow the material to soften and to conform one end plate against the curved mold to form a monolithic honeycomb structure with a curved end plate surface.

12. A method of producing a substantially monolithic honeycomb sandwich panel structure as claimed in claim 1, wherein at least one of said first and second end plates is initially curved, and the end faces of the tubes are angled to conform to the at least one curved end plate prior to being positioned to form the honeycomb array of tubes.

13. A method of producing a substantially monolithic honeycomb sandwich panel structure as claimed in claim 1 wherein at least one curved retaining plate is placed against either the top or bottom end plate to act as a mold therefor to conform the end plate to a predetermined curve by pressing the softened end plate against it with the gas pressure differential, thereby creating a sandwich panel containing at least one curved end plate at the same time that the tubes are being softened and bonded to the adjacent tubes and end plates.

14. A substantially monolithic honeycomb sandwich panel structure formed by the method of claim 1.

15. A substantially monolithic honeycomb sandwich panel structure formed by the method of claim 2.

16. A substantially monolithic honeycomb sandwich panel structure formed by the method of claim 3.

17. A substantially monolithic honeycomb sandwich panel structure formed by the method of claim 6.

18. A substantially monolithic honeycomb sandwich panel structure formed by the method of claim 7.

19. A substantially monolithic honeycomb sandwich panel structure formed by the method of claim 8.

20. A substantially monolithic honeycomb sandwich panel structure formed by the method of claim 10.

21. A substantially monolithic honeycomb sandwich panel structure formed by the method of claim 11.

22. A substantially monolithic honeycomb sandwich panel structure formed by the method of claim 12.

23. A substantially monolithic honeycomb sandwich panel structure formed by the method of claim 13.

* * * * *